United States Patent [19]

Nakayama

[11] Patent Number: 4,750,032
[45] Date of Patent: Jun. 7, 1988

[54] AUTOMATIC WHITE BALANCE ADJUSTING SYSTEM FOR A COLOR VIDEO CAMERA

[75] Inventor: Yoshiaki Nakayama, Tokyo, Japan

[73] Assignee: Fuji Photo Film Co., Ltd., Japan

[21] Appl. No.: 866,332

[22] Filed: May 22, 1986

[30] Foreign Application Priority Data

May 24, 1985 [JP] Japan .................................. 60-110162

[51] Int. Cl.⁴ .............................................. H04N 9/73
[52] U.S. Cl. ...................................................... 358/29
[58] Field of Search ........................................... 358/29

[56] References Cited

U.S. PATENT DOCUMENTS

| | | | |
|---|---|---|---|
| 4,219,841 | 8/1980 | Nishimura | 358/29 C |
| 4,486,771 | 12/1984 | Machida | 358/29 C |
| 4,562,459 | 12/1985 | Sokei | 358/29 C |

*Primary Examiner*—Michael A. Masinick
*Attorney, Agent, or Firm*—Abelman Frayne Rezac & Schwab

[57] ABSTRACT

An automatic white balance adjusting system for a color video camera employs a high luminance part of the luminance signal to control automatic gain controllers for the red and blue components of the signals.

3 Claims, 2 Drawing Sheets

AUTOMATIC WHITE BALANCE ADJUSTING SYSTEM FOR A COLOR VIDEO CAMERA

FIELD OF THE INVENTION

This invention relates to an automatic white balance adjusting system for a color video camera, which is easy to adjust and capable of providing a warning when a once-adjusted white balance must be readjusted as a consequence of change in color temperature of the subject.

BACKGROUND OF THE INVENTION

Various types of light sources, such as sunlight, fluorescent lamps, and incandescent lamps are used for recording a video of a subject using a color video camera. When the same subject is illuminated with different light sources, it appears almost same to human eye. However, the spectral distribution of light measured by a physical means is substantially different with each type of the light source. For example, white paper appears white under light from any type of light source. This is referred to as color adaptation of human eye.

On the other hand, color video cameras use physical light measurement, and this correction is necessary for matching the color adaptation of human eyes. A subject which appears white to human eyes must always be reproduced correctly white under any lighting condition. If a white subject is reproduced white to human eyes, colors will be reproduced correctly in visual sense. Adjusting the color video camera so that white can be correctly reproduced is referred to as "white balance adjustment".

Heretofore, white balance adjustment usually has been made manually. However, this adjustment is very troublesome for the user, and it is difficult to obtain the correct adjustment. This has been an obstacle to popularization of home-use color video.

Recently, an automatic white balance adjusting system which automatically adjusts white balance prior to recording video has been developed and marketed. This system utilizes the principle that white balance is correct if the differential color signal is zero when a white subject it taken. Thus, the different color signal is automatically adjusted to zero by taking a white subject.

OBJECT AND SUMMARY OF THE INVENTION

With a view to obviating the prior art defects of automatic white balance adjusting systems, it is a primary object of the present invention to provide an automatic white balance adjusting system for a color video camera, which is easy to adjust using the actual subject for comparison, and which has a warning function to correctly warn the operator if the color temperature changes substantially after the white balance has been adjusted.

According to the present invention the white balance is adjusted with respect to the brightest part of the subject, it being assured that the brightest part of the subject is white. It has been found that there is no problem when the subject is taken with the above white balance adjustment, in that the brightest part of the subject is sensed as white by the human eye without regard to what color it has in actuality.

Based on the above finding, the present invention provides an automatic white balance adjusting system for a color video camera which adjusts the differential color signals to zero levels by forming negative feedback loops to control automatic gain controllers employed for controlling color signals. The controllers comprise a first comparison circuit for comparing the level of a luminance signal at each timing of a video signal with a first reference value, a second comparison circuit for comparing a differential color signal corresponding to part of the luminance signal having higher level than the first reference value detected by the first comparison circuit with a second reference value, automatic gain controllers for controlling gain of color signals corresponding to the differential color signals so that differences between the color signals and the second reference signal are zero, a circuit for holding the automatic gain controllers at the difference of zero, a detection circuit for detecting whether the level of the differential color signal corresponding to part of the luminance signal having higher level than the first reference value detected by the first comparison circuit is within a predetermined range, and a warning circuit operating when the level of the differential color signal of the detection means is out of a predetermined range.

BRIEF DESCRIPTON OF THE DRAWINGS

FIG. 1 is a block diagram showing schematically an embodiment of the white balance adjusting system according to the present invention.

FIG. 2(a) and 2(b) are graphics showing the waveforms on the components of the system according to the present invention.

FIG. 3 is a block diagram showing schematically a system for adjusting white balance according to the prior art.

DESCRIPTION OF THE PRIOR ART

FIG. 3 is a block diagram showing a prior art automatic white balance adjusting system. In the Figure, numeral 1 indicates a subject, and numeral 2 indicates a white plate which is used for adjusting white balance prior to recording, a light transmitting lens cap in this example. Numeral 3 indicates a lens, numeral 4 is a color image pickup tabe, numeral 5 is a signal processing circuit, numeral 6 is an automatic gain controller for red, numeral 7 is an automatic gain controller for blue, and numeral 8 is a matrix circuit. The matrix circuit 8 is supplied with a luminance signal Y, a red color signal R and a blue color signal B. Differential color signals R−Y and B−Y are produced from the color signals R and B and the luminance signal Y. Numerals 9, 10 and 11 indicate output terminals for transmitting the luminance signal Y, and the differential color signals R−Y and B−Y, respectively. Numerals 12 and 13 indicate integrating circuits which consist of resistors R1 and R2 and capacitors C1 and C2. Numerals 14 and 15 indicate comparators, and numerals 16 and 17 indicate up-down counters.

With prior art system using the above described apparatus, when adjusting the white balance, white light transmitted from the subject 1 passes through the white plate 2, and is introduced to the image pickup tube 4 through the lens 3. An output signal from the image pickup tube 4 is supplied to the signal processing circuit 5, and transmitted as a luminance signal Y which is an electrical signal controlling the brightness, and as the color signals R and B which are electrical signals representing colors. Among these signals, the color signals R and B are supplied to the matrix circuit 8 through the automatic gain controllors 6 and 7, and the luminance signal Y is directly supplied to the matrix circuit 8. From the color signals R and B and the luminance signal Y, the matrix circuit 8 produces the differential color signals R−Y and B−Y and transmits out the signals together with the luminance signal Y through the output terminals 9, 10, and 11. Thus, the luminance signal Y is transmitted from the output terminal 9, the differential color signal R−Y from the output terminal 10, and the differential color signal B−Y from the output terminal 11, respectively.

The integrating circuit 12 integrates the differential color signal R−Y. The white balance will be correct if the integrated value is zero. However, it is to be noted that the color signal R−Y generally includes a DC component due to the circuit configuration. Then, the integrated value is compared with a reference voltage Vref which corresponds to the above DC component (hereinafter the differential color signal equal to the reference voltage Vref is referred to as a "zero-level differential color signal"). The up-down counter 16 has a counter section which counts up or down according to the polarlity of output of the comparator 14, and a D/A converter which converts the up-down output to an analog signal. The D/A converter controls the gain of the automatic gain controller 6, thereby forming a negative feedback loop. The above negative feedback loop including the digital circuit converges on a status that the up-down counter 16 repeats binary values (at the correct white balance), and stores a binary value counted by either of the up-down counters.

More specifically, when output signal of the comparator 14 is on a high level, the up-down counter 16 functions as an up-counter to count clock pulses and controls the automatic gain controller 6 through the D/A converter so that the gain of the automatic gain controller 6 decreases. The control is continued while the output signal of the comparator 14 is on a high level, and clock pulses corresponding to the period are counted. As a result, the output signal of the comparator 14 finally goes to a low level. When the output signal level of the comparator 14 is low, the up-down counter 16 functions as a down-counter to count clock pulses and controls the automatic gain controller 6 through the D/A converter so that the gain of the automatic gain controller 6 increases. Thus, the output signal of the comparator 14 will return to a high level again, and the same operation is repeated. As a result, the count of the up-down counter 16 converges on a constant value. If the clock pulses are stopped at this status, a count for the correct white balance will become stored in the up-down counter 16.

Thus, the up-down counter 16 in the automatic white balance adjusting system functions as a control voltage generator for the automatic gain controller 6 and also as a memory circuit.

The above description has been made for the differential color signal R−Y. The same white balance adjustment is made for the differential color signal B−Y, by means of the integrating circuit 13, which functions in a corresponding manner to the integrating circuit 12, the up-down counter 17 corresponding to the up-down counter 16, and the automatic gain controller 7 corresponding to the automatic gain controller 6.

Thus, the subject 1 can be taken by the color video camera with the white balance adjusted to the color temperature of the subject 1.

With the above described prior art system, the subject 1 is taken by the color video camera of which the white balance has been adjusted prior to recording. However, when the white balance has been once adjusted prior to recording, conditions of the automatic gain controllers 6 and 7 are fixed to those at the time of the adjustment. Therefore, an automatic white balance adjusting system having a warning function which operates when the color temperature of the subject 1 is substantially changed after the white balance adjustment has also been proposed (e.g. one disclosed in Japanese Patent Application Laying-open No. 42380/1983).

According to the prior art construction, however, light from the light source must be guided to the image pickup tube 4 through the white plate 2, a milk-white lens cap for example, on the lens 3, or a white paper other than the subject 1 must be taken to adjust the white balance. This is due to the fact that all of the diffferential color signals R−Y and B−Y are integrated in the prior art automatic white balance adjusting system.

More specifically, if the actual subject 1 presents colors or tints other than white or grey, the white balance adjustment is much affected by the presence of such colors or tints. The white balance adjustment is made by employing the differential color signals R−Y and B−Y in the presence of such colors or tints. Therefore, the prior art cannot adjust the white balance by using the actual subject 1 if it is colored or tinted, and a special operation is required for securing proper white balance adjustment. This causes the white balance adjustment to be troublesome and impedes easy and rapid video recording.

Moreover, with a system having a warning function which operates when a change in the color temperature of the subject 1 occurs after the white balance has been adjusted, then, the total integrated color signal value when taking the subject 1 is compared with the color signal level when the white balance adjustment has been completed, and the integrated value is very much affected by the actual colors of the subject 1. Even if the effect is not so important, a special operation such as mounting a milk-white lens cap on the lens 3 is required for readjusting the white balance, as in the case of the former system.

DESCRIPTION OF THE PREFERRED EMBODIMENT

Figure 3:
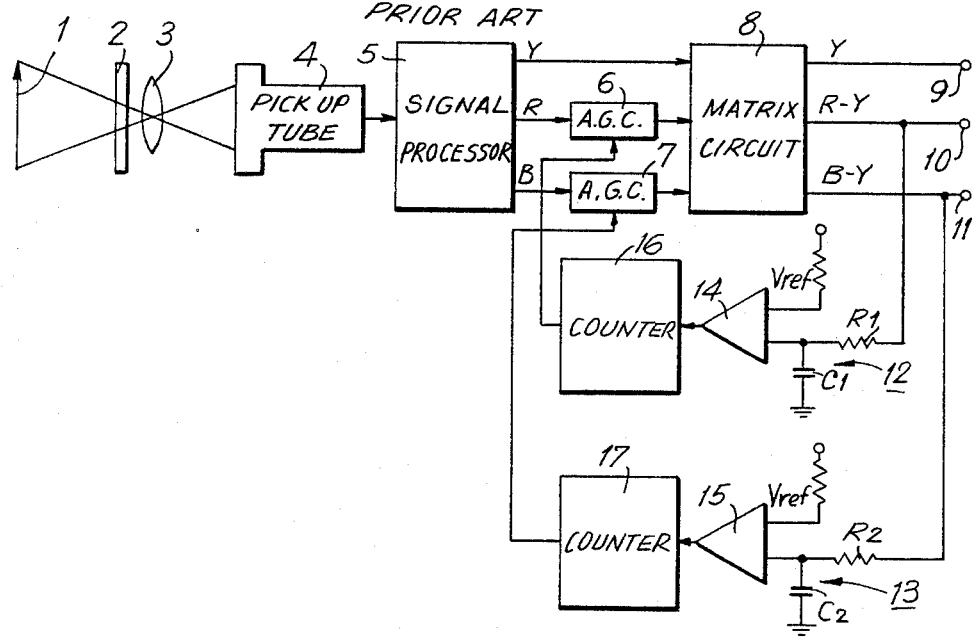

A preferred embodiment of the present invention will now be described in detail with reference to the drawings. The same numerals are used in FIG. 1 as those used in FIG. 3 to denote corresponding components and circuits, and descriptions are not repeated.

Figure 1:
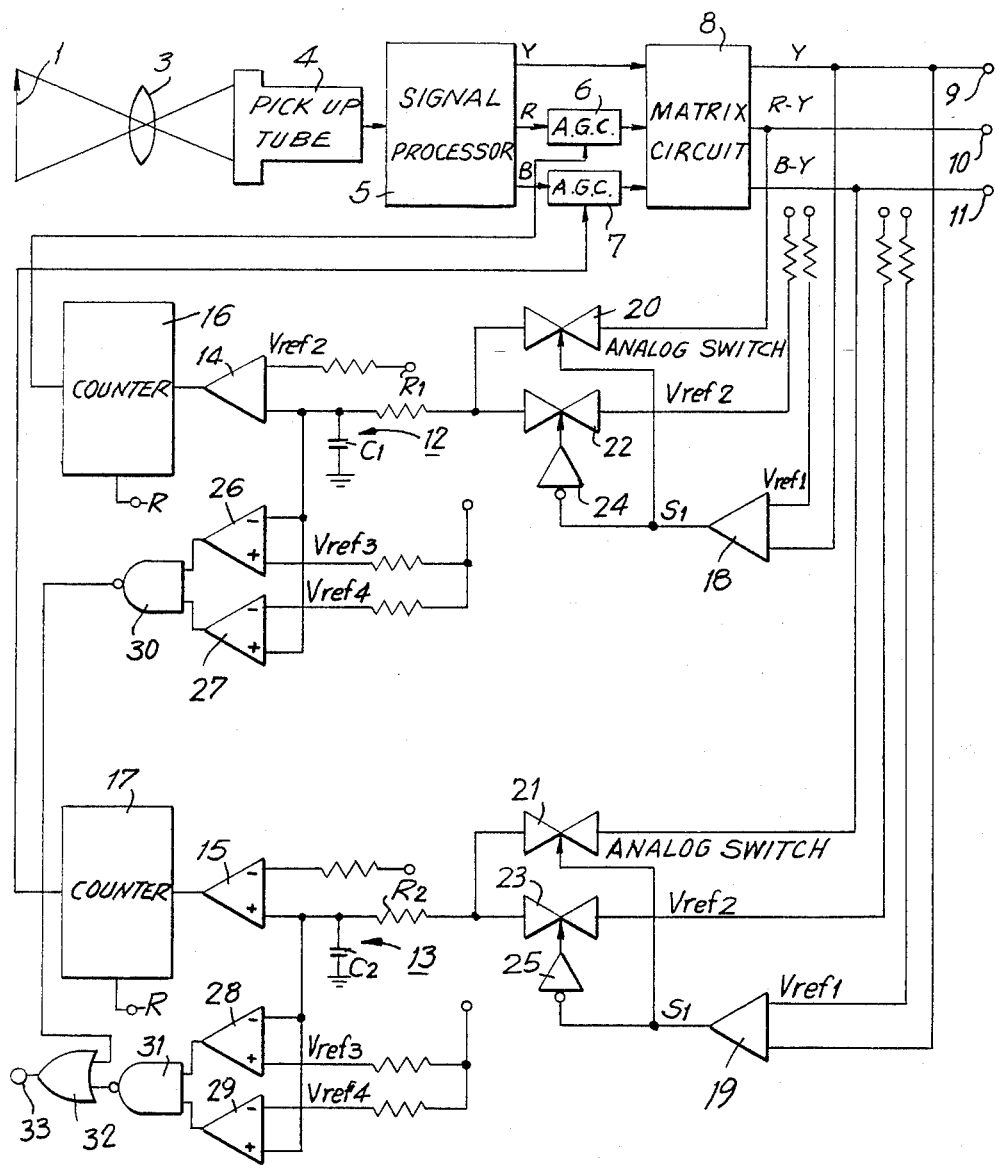

FIG. 1 is a block diagram showing an embodiment of the system according to the present invention. Referring to FIG. 1, a comparator 18 compares level of a luminance signal Y sequentially outputted as a video signal with a first reference value Vref1. When the level of the luminance signal Y is higher than the first reference value Vref1, the comparator 18 goes to a high level and operates an analog switch 20. The comparator 18 also controls an analog swtich 22 through inverter 24. When the level of the luminance signal Y is lower than the first reference value Vref1, the analog switch 22 is operated by a low level signal inverted by the inverter 24. Thus, either one of the analog switches 20 and 22 is operated depending on the relationship between the luminance signal Y and the first reference value Vref1. The first reference value is set such that the signal representing the brightest portion of the image (which is sensed as white by human eyes and processed as white) can be extracted, or it is set to a determined lower level that can be produced as white. The analog switch 20 supplies the differential color signal R−Y to an input terminal of a comparator 14 through an integrating circuit 12 which is similar to that used in the prior art, or alternatively the analog switch 22 supplies a second reference voltage Vref2 to the same input terminal of the comparator 14. The second reference voltage Vref2 corresponds to zero level of the differential color R−Y.

The other input terminal of comparator 164 also is supplied with the second reference voltage Vref2. As a result, the comparator 14 either compares an integrated value of the differential color signal R−Y, or, the second reference voltage Vref2 with that of the second reference voltage Vref2 supplied to the other terminal of comparator 14, or, it compares the integrated value of the differential color signal alone with the second reference voltage Vref2, supplied to the other terminal and transmits a signal corresponding to the comparison results to an up-down counter 16 similar to that used in the prior art.

The same white balance adjustment is made for the differential color signal B−Y, by employing a comparator 19 having the function corresponding to that of the comparator 18, an analog switch 21 having a function corresponding to the analog switch 20, an analog swtich 23 having a function corresponding to the analog switch 22, an inverter 25 having a function corresponding to the inverter 24, an integrating circuit 13 having a function corresponding to the integrating circuit 12, a comparator 15 having a function corresponding to the comparator 14, and an up-down counter 17 having a function corresponding to the up-down counter 16.

When recording an image with a color video camera, the white balance must be adjusted and set prior to recording the image. If the white balance is not set and fixed, variations in the white balance will cause confusing changes in color during reproduction of the image, human eyes being very sensitive to timewise changes in color. On the other hand, if the white balance is adjusted and fixed, correct color will not be obtained if the white balance of the subject being recorded changes due to changes in lighting. Then, a warning device is required to warn the operator that the white balance has shifted substantially out of the initial adjustment.

This embodiment according to the present invention has a warning function, in addition to the white balance adjusting function. the circuits providing this function will now be described.

Comparators 26 and 27 are window comparators, of which output is supplied to a NAND circuit 30. Specifically, a non-inverting input terminal of the comparator 26 is supplied with a third reference value Vref3, and a inverting input terminal is supplied with the integrated value (R−Y) int of the differential color signal R−Y (high intensity part) or the second reference signal Vref2 (high intensity part). A non-inverting input terminal of the comparator 27 is supplied with the above integrated value (R−Y) int or the second reference signal Vref2, and its inverting input terminal is supplied with a fourth reference signal Vref4. These signals are set to satisfy a relation of Vref3 - Vref2 - Vref4. Thus, both outputs of the comparators 26 and 27 are on high level. The output of the NAND circuit 30 can be a low level only when a relation of VREF3 - (R−Y)int - Vref4 is satisfied. The output of the NAND circuit 30 will go to a high level if the integrated value (R−Y)int of the differential color signal R−Y is higher than the third reference signal Vref3, or if it is lower than the fourth reference value Vref4. A warning device 33 operates to warn the operator when output of an OR circuit 32 goes to a high level, i.e. at least one of the outputs of NAND circuits 30 and 31 goes to a high level.

The above description has been made for the differential color signal R−Y. The same processing is employed for the differential color signal B−Y. Thus, a comparator 28 has a function corresponding to that of the comparator 26, a comparator 29 has a function corresponding to the comparator 27, and the NAND circuit 31 has a function corresponding to the NAND circuit 30, and an integrated value (B−Y)int of the differential color signal B−Y functionally corresponds to the integrated value (R−Y)int of the differential color signal R−Y.

With the system of this embodiment, when adjusting the white balance, the color video camera is directed to the subject 1, and light reflected by the subject 1 is introduced to an image pickup tube 4 through a lens 3. Thus, the subject 1 is directly taken. Output signal of the image pickup tube 4 is supplied to a signal processing circuit 5 where it is converted into luminance signal Y representing the intensity, and into color signals R and B representing the colors. The color signals R and B are supplied to a matrix circuit 8 through automatic gain controllers 6 and 7, and the luminance signal Y is directly supplied to the matrix circuit 8. The matrix circuit 8 produces the differential color signals R−Y and B−Y from the color signals R and B and the luminance signal Y. The luminance signal Y and the signals R−Y and B−Y are respectively outputted through the output terminals 9, 10, and 11.

Figure 2A:
Figure 2B:
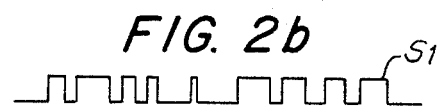

The comparator 18 compares the level of the luminance signal Y with the first reference value Vref1. This process is graphically shown in FIG. 2(a). As a result, a pulse signal S1 is obtained, of a width corresponding to a highly illuminated area of the subject that can be sensed as white in view of the characteristics of human eyes. The waveform of the pulse signal S1 is shown in FIG. 2(b).

The pulse signal S1 controls the analog switch 20 directly and controls the analog switch 22 through the inverter 24. Therefore, one or other of the analog switches 20 and 22 is always conductive. This causes either the differential color signal R−Y or the second reference signal Vref2 to be supplied to the intergrating circuit 12. The signal of one frame, for example, is integrated, and the integrated value is compared with the second reference value Vref2 by the comparator 14.

Based on the result, the up-down counter 16 conrols the gain of the automatic gain controller 6, using a negative feedback loop same as used in the prior art, to return the output of the comparator 14 to zero. After that, the automatic gain controller 6 is held at a condition in which the white balance is correctly adjusted by the up-down counter 16. Consequently, the white balance is adjusted by the differential color signal of the part corresponding to the highly illuminated part of the subject, and the differential color signal of the part corresponding to the low intensity illumination part of the subject is cancelled and not available for adjusting the white balance. Thus, the white balance for a first shot is held at the first adjusted condition, and is then reset and readjusted for every subsequent shot of the recording run. A reset terminal R of the up-down counter 16 is employed for the purpose.

The above description has been made for the differential color signal R−Y. The gain of the automatic gain controller 7 is also controlled for the differential color signal B−Y using the same procedure.

After the white balance is adjusted using the above described procedure, the subject 1 is actually recorded. During the recording process, for the highly illuminated part provide a signal above the first reference voltage Vref1, the integrated values (R−Y)int and (B−Y)int of the differential color signals R−Y and B−Y corresponding to that part. For signals corresponding with the low intensity illumination and below the first reference voltage Vref1, the second reference value Vref2, is substituted and supplied to the comparators 26, 27, 28 and 29, respectively. As a result, if at least one of the integrated values (R−Y)int and (B−Y)int is within a predetermined range that is smaller than the third reference voltage Vref3 and greater than the fourth reference voltage Vref4, (i.e. the white balance is substantially out of the correct adjustment), the warning device 33 is operated through the NAND circuits 30 and 31 and the OR circuit 32. In turn, the white balance is automatically adjusted by resetting the up-down counters 16 and 17 when the warning device 33 operates.

The above described embodiment uses the up-down counters 16 and 17 as the devices to hold the automatic gain controllers 6 and 7 at a condition in which the white balance is correctly adjusted. Any other device which functions as a control voltage generator for the automatic gain controllers 6 and 7 and as memory circuit to store the condition with the correct adjustment can be used in substitution for the counters 16 and 17.

The above described embodiment is of particular use for white balance adjustment in recording animated images. For white balance adjustment in taking still pictures, the devices corresponding to the up-down counters 16 and 17 can be eliminated, and differential transformers can be used in substitution for the comparators 14 and 15. The automatic gain controllers 6 and 7 are then controlled directly by the outputs of the differential transformers so that the differences between the levels of the differential color signals R−Y and B−Y and the second reference value are zero for the correct white balance.

Still pictures are of independent, separate images, and this white balance adjustment must be made prior to recording each successive picture. As the white balance adjustment is effected automatically before recording each image, the effects of the present invention is further remarkable for still pictures.

In another embodiment to which the present invention can be applied, the white balance can be adjusted for still pictures by employing the up-down counters 16 and 17, in which case their functioning as memory circuits is not required.

Further, by making it selectable whether or not the up-down counters 16 and 17 are operated as memory circuits, the present invention can be applied to an electronic camera used for recording either or moving images.

I claim:

1. In an automatic white balance adjusting system for a color video camera of the type including a first circuit for comparing a matrix red and luminance signal with a first reference voltage, and for adjusting a gain control for said red signal in dependence on the output of said first comparator circuit, and a second comparator circuit for comparing a matrix blue and luminance signal with said first reference voltage, and for adjusting a gain control for said blue signal in dependence on the output of said second comparator circuit, the improvement comprising:

a third comparator circuit for comparing a luminance signal with a second reference voltage, and having an output connected to control first switch means, said first switch means being operative to supply said matrix red and luminance signal to said first comparator when said luminance signal exceeds said second reference voltage, and to substitute said first reference voltage for said matrix red and luminance signal to lock said first comparator circuit when said luminance signal exceeds said second reference voltage;

a fourth comparator circuit for comparing a luminance signal with said second reference voltage and having an output connected to control second switch means, said second switch means being operative to supply said matrix blue and luminance signal to said second comparator when said luminance signal exceeds said second reference voltage, and to substitute said first reference voltage for said matrix blue and luminance signal to lock said second comparator circuit when said luminance signal exceeds said second reference voltage.

2. The automatic white balance adjusting system of claim 1, including fifth and sixth comparator circuits each supplied with said matrix red and luminance signal, and respectfully connected to third and fourth reference voltages, said fifth and sixth comparator circuits having outputs connected to operate an alarm device, and, seventh and eighth comparator circuits each supplied with said matrix blue and luminance signal and respectfully connected to said third and fourth reference voltages, said seventh and eighth comparator circuits having outputs connected to operate an alarm device.

3. The automatic white balance adjusting system of claim 2, including circuit means for reducing the gain of an associated one of said automatic gain controls on operation of an associated one of said alarm devices.

* * * * *